INVENTORS
R. G. LeTourneau
Carl Graham
BY
ATTYS

Patented Mar. 21, 1944

2,344,622

UNITED STATES PATENT OFFICE 2,344,622

TAP SUPPORTING CARRIAGE FOR LATHES

Robert G. Le Tourneau, Peoria, Ill., and Carl Graham, Toccoa, Ga., assignors to R. G. Le Tourneau, Inc., Stockton, Calif., a corporation of California Application January 2, 1943, Serial No. 471,126

7 Claims. (Cl. 10—129)

This invention relates in general to an improved tool supporting carriage for machine lathes, and particularly a longitudinally movable carriage for holding tools adapted for engagement into the interior of hollow work from one end of the latter; the invention being especially directed to, and it is the principal object to provide, a unique longitudinally movable carriage assembly arranged in combination with and supporting a tap adapted to engage in and tap an adjacent and open end of the work.

A further object of this invention is to provide a tap supporting carriage for lathes, as in the preceding paragraph, in which the carriage assembly is designed for use with a collapsing tap; i. e., a tap of that type wherein, after predetermined entry of the tap into the work, an element included in the tap engages one end of the work and trips a mechanism which causes the lands or cutters to collapse radially inwardly.

An additional object of the invention is to provide in a lathe, a carriage assembly including a base secured on the bed of the lathe, said base having a guide track, a carriage, and anti-friction bearings or rollers mounting the carriage for guided longitudinal movement along said track; and a collapsing tap mounted in connection with and projecting from one end of said carriage parallel to the direction of travel of the latter and axially of the work.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 4 is a top plan view of the tap mounting carriage and the supporting base for said carriage, detached.

Figure 1:
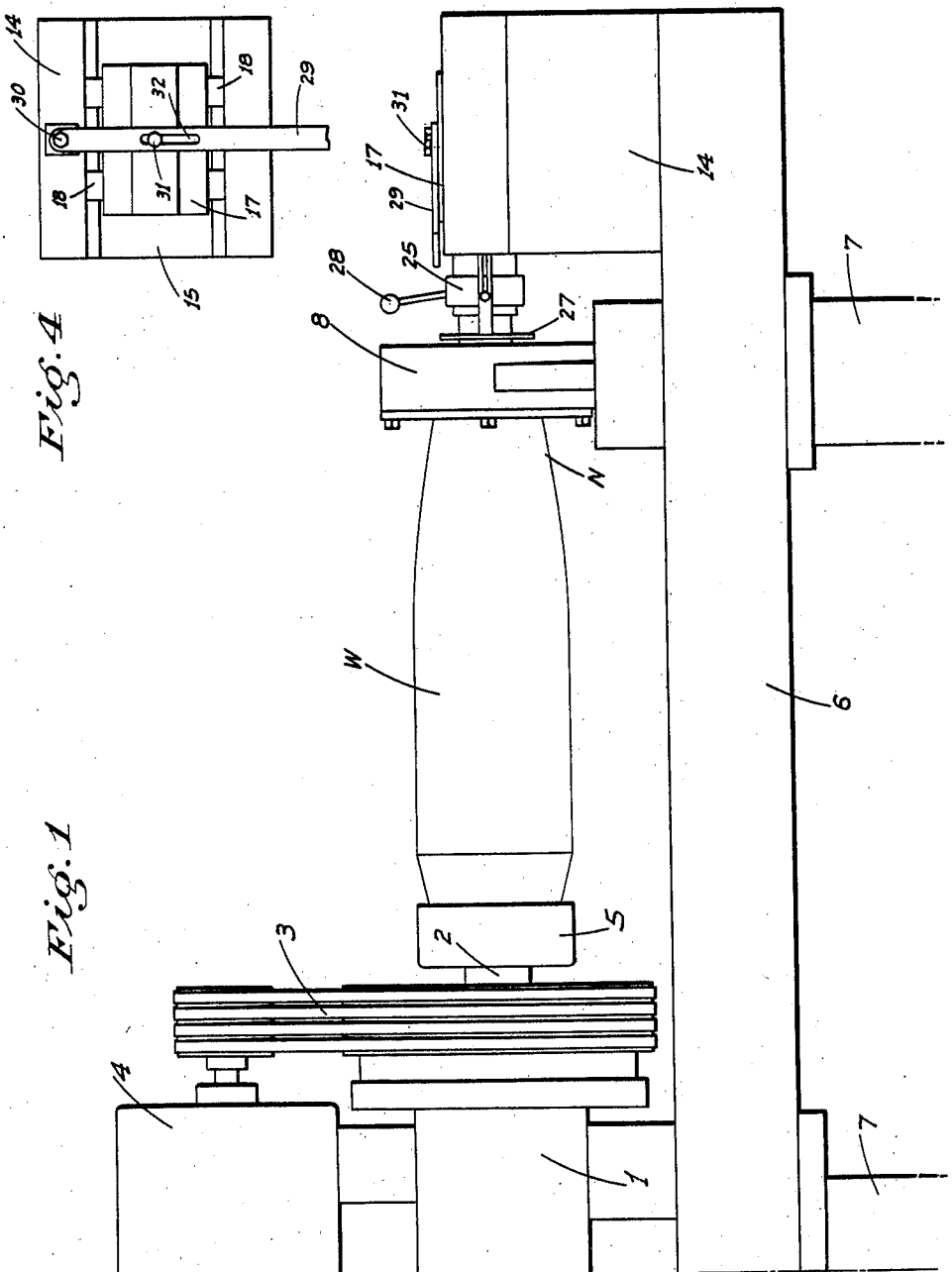
Figure 1 is a side elevation of a lathe embodying the tap supporting carriage.
Figure 2:
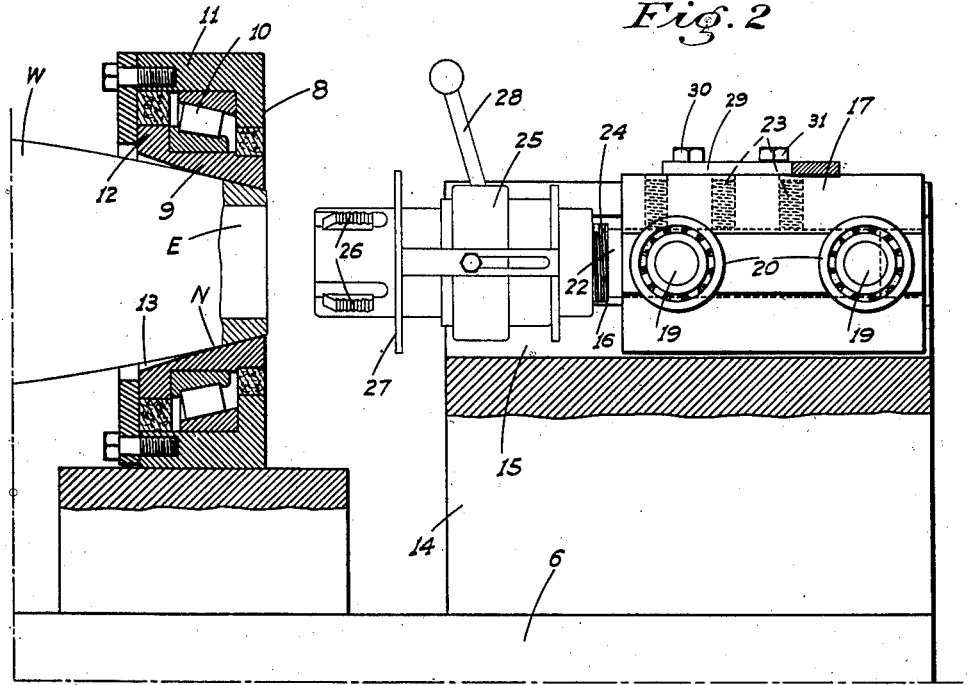
Figure 2 is an enlarged fragmentary side elevation, mainly in section, illustrating the tap supporting carriage and the adjacent work centering rest.
Figure 3:
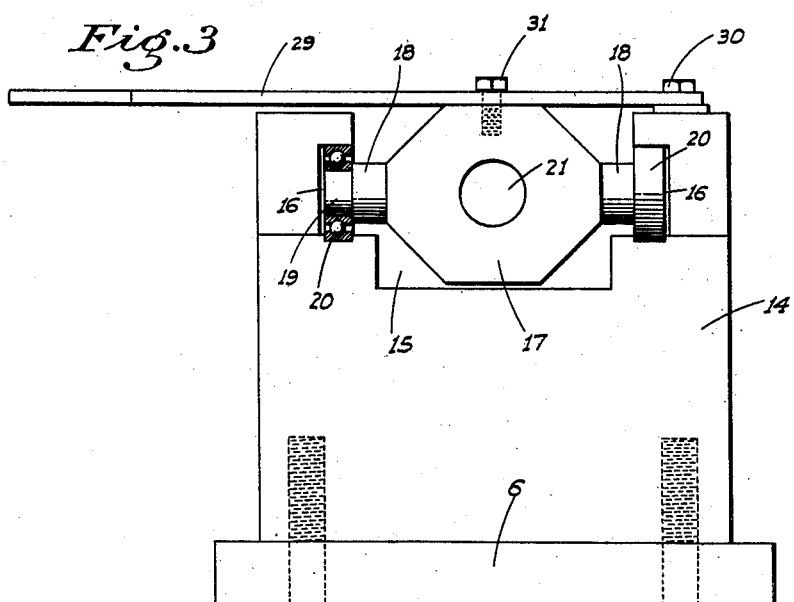
Figure 3 is an enlarged rear end view, partly in section, of the carriage assembly.

Referring now more particularly to the characters of reference on the drawings, the improved tap supporting carriage is adapted for use in connection with a lathe which includes instrumentalities to support hollow work open at one end in driven centered relation, with said open end of the work exposed for the entry of a machine tool. The lathe on which the tap supporting carriage is here shown is otherwise substantially as illustrated in copending application for U. S. Letters Patent, Serial No. 470,352, filed December 28, 1942, on Headstock and centering rest assembly.

The lathe includes a headstock 1 having a rotary mandrel 2 driven by a suitable drive unit 3 from a motor driven, speed reduction gear box 4. A work engaging, cup-like driving head 5 is mounted on the outer end of the mandrel 2 for supporting, centering, and driving engagement with the adjacent tapered end of the work W. The work, as illustrated, is an ordnance shell, said shell being hollow and open at its outer end. The mandrel 2 and driving head 5 are mounted for manually controlled, power actuated axial movement in the manner shown in the identified copending application.

The headstock 1 is supported on a flat rigid bed 6 mounted on legs 7, and a work supporting and centering rest, indicated generally at 8, is mounted in upstanding position on the bed 1 of the lathe in axially alined but spaced relation to the headstock. This centering rest comprises a rotary collar 9 supported by a taper roller bearing 10 seated in an annular cage 11; the collar being annularly flanged as at 12 and retained by said cage and bearing against axial movement. The opening 13 in the collar is formed to symmetrically and frictionally engage and center the adjacent end of the work W, here shown as the taper nose N of the ordnance shell. The above described work supporting and centering rest 8 thus supports the hollow work W with its open end E exposed for entry of a machine tool thereinto.

The tap supporting carriage assembly, which is the subject of the present invention, is mounted on the bed of the lathe beyond the centering rest 8 and comprises a base 14 fixed on and upstanding from said bed of the lathe. The base 14 is of substantial height and length and at the top is formed with a horizontal, longitudinally extending, upwardly opening channel 15 which extends from end to end of said base.

The opposite sides of channel 15 are formed with inwardly opening, horizontal, longitudinally extending grooves 16, which are U-shaped in cross section.

An elongated, horizontal carriage block 17 is disposed in channel 15 with the bottom of the block close to but spaced from the bottom of said channel. Pairs of longitudinally spaced stub shafts or trunnions 18 project rigidly and laterally from opposite sides of the carriage block 17; said trunnions projecting into corresponding grooves 16. The portion of trunnions 18 in grooves 16 are formed as reduced-diameter spindles 19 on which are mounted rollers 20, which in the present embodiment are ball bearings, the outer race of which forms the roller. The diameter of the rollers 20 is such that said rollers engage with a close running fit in the grooves 16 whereby to prevent any appreciable vertical displacement of the carriage block 17 from horizontal. As mounted, the carriage block is free to traverse a horizontal path upon advancing and retracting movement relative to the centering rest 8 and the work supported therein.

The carriage block 17 is formed with a horizontal or axial bore 21 therein, said bore being open to the end of the block adjacent the centering rest 8. A shank 22 projects into bore 21 from said open end thereof, and is secured therein by a plurality of radial set screws 23 threaded in the block 17 in longitudinally spaced relation.

The outer end of the shank 22 is formed with a threaded head 24 on which is screwed a collapsing tap, indicated generally at 25; such tap being of a type available on the market and which includes circumferentially spaced cutters 26 which collapse or shift inwardly upon engagement of a ring-like tripping element 27 with the adjacent end of the work after the cutters enter the work to a predetermined depth. The tap also includes a tap resetting handle 28.

In use the operator advances the carriage block manually until the cutters of the tap begin their cutting engagement in the open end E or bore of the rotating work W. Thereafter, with continued rotation of the work, the tap is self-feeding, which draws the carriage with it. When the cutters enter the work to said predetermined depth, the tripping element 27 engages the exposed end of the work and the tap collapses; that is, the cutters 26 move radially inwardly, which stops the tapping operation. Then the operator retracts the carriage and tap, resetting the latter for the following tapping operation.

In order to facilitate manual movement of the carriage, a hand lever 29 is pivoted at one end on top of base 14 on one side as at 30; the lever extending across the carriage and being operatively connected thereto by a pin 31 mounted in the carriage and projecting upwardly through a longitudinal slot 32 in the lever.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A tap supporting carriage assembly for a lathe which includes instrumentalities to support work in centered and driven relation and with an open end of said work exposed; said carriage assembly comprising a base, said base being disposed beyond the position of supported work and having a longitudinally extending channel formed therein, a carriage, means including anti-friction rollers mounting said carriage in said channel for free but guided, straight line movement therealong, and a self-feeding tap secured in connection with and projecting from one end of the carriage in axial alinement with said open end of the work and adapted for starting engagement therein upon movement of the carriage in a corresponding direction.

2. A tap supporting carriage assembly for a lathe which includes instrumentalities to support work in centered and driven relation and with an open end of said work exposed; said carriage assembly being disposed beyond said end of the work and comprising a base, an upwardly opening, longitudinally extending channel formed in said base, a carriage block disposed in said channel, anti-friction rollers mounting said carriage block in the channel for free but guided, straight line movement in a direction parallel to the axis of the lathe and supported work, and a self-feeding tap mounted in connection with and projecting from one end of the carriage block in axial alinement with said open end of the work and adapted for starting engagement therein upon movement of the carriage block in a corresponding direction.

3. A tap supporting carriage assembly for a lathe which includes instrumentalities to support work in centered and driven relation and with an open end of said work exposed; said carriage assembly being disposed beyond said end of the work and comprising a base, an upwardly opening longitudinally extending channel formed in said base, said channel having opposed side walls, said side walls having inwardly opening longitudinally extending grooves therein, a carriage block disposed in said channel, rollers mounted in connection with said carriage block and riding in said grooves and supporting said carriage for free but guided straight line movement, and a self-feeding tap mounted in connection with and projecting from one end of the carriage block in axial alinement with said open end of the work and adapted for starting engagement therein upon movement of the carriage block in a corresponding direction.

4. A tap supporting carriage assembly for a lathe which includes instrumentalities to support work in centered and driven relation and with an open end of said work exposed; said carriage assembly being disposed in axially spaced relation beyond the work and comprising a fixed base, a horizontal longitudinally extending channel formed in said base at the top, an elongated carriage block disposed in said channel, the sides of the channel having inwardly opening horizontal grooves therein, longitudinally spaced rollers journaled on opposite sides of the carriage block and riding in said grooves and supporting said carriage for free but guided straight line movement, and a self-feeding tap projecting from one end of the carriage in axial alinement with the work and adapted for starting engagement in said open end thereof upon movement of the carriage in a corresponding direction.

5. A tap supporting carriage assembly for a lathe which includes instrumentalities to support work in centered and driven relation and with an open end of said work exposed; said carriage assembly being disposed in axially spaced relation beyond the work and comprising a fixed base, a horizontal longitudinally extending channel formed in said base at the top, an elongated carriage block disposed in said channel, the sides of the channel having inwardly opening horizontal grooves therein, longitudinally spaced trunnions projecting laterally from the carriage block on opposite sides, rollers journaled on said trunnions riding in said grooves and supporting said carriage for free but guided straight line movement, and a self-feeding tap projecting from one end of the carriage in axial alinement with the work and adapted for starting engagement in said open end thereof upon movement of the carriage in a corresponding direction.

6. A tap supporting carriage assembly as in claim 5 in which the rollers engage with a close running fit between upper and lower walls of said grooves whereby to accomplish said straight line movement of the carriage block and supported tap.

7. A tap supporting carriage assembly for a lathe which includes instrumentalities to support work in centered and driven relation and with an open end of said work exposed; said carriage assembly being disposed beyond said end of the work and comprising a base, an upwardly opening, longitudinally extending channel formed in said base, a carriage block disposed in said channel, means mounting the carriage block in the channel for free but guided straight line movement therealong, a tap mounted in connection with and projecting from the adjacent end of the carriage block in axial alinement with said open end of the work for starting engagement therein upon movement of said carriage block in a corresponding direction, a horizontally swingable hand lever pivoted on top of the base to one side of but overhanging said channel, and means connecting the overhanging portion of the lever with the carriage block so as to effect said movement of the carriage block upon swinging movement of the lever, one end of said lever projecting beyond the base as a handle.

ROBERT G. LE TOURNEAU.
CARL GRAHAM.